(12) United States Patent
Saucerman et al.

(10) Patent No.: US 8,955,850 B2
(45) Date of Patent: Feb. 17, 2015

(54) ABEYANCE SEAL FOR HIGH TEMPERATURE, HIGH PRESSURE APPLICATIONS

(71) Applicants: James D. Saucerman, Murrieta, CA (US); Lionel A. Young, Murrieta, CA (US); Ronald L. Grace, Fallbrook, CA (US); John Davis, Temecula, CA (US); David Zegres, Northhampton, PA (US)

(72) Inventors: James D. Saucerman, Murrieta, CA (US); Lionel A. Young, Murrieta, CA (US); Ronald L. Grace, Fallbrook, CA (US); John Davis, Temecula, CA (US); David Zegres, Northhampton, PA (US)

(73) Assignee: Flowserve Management Company, Irving, TX (US)

( * ) Notice: Subject to any disclaimer, the term of this patent is extended or adjusted under 35 U.S.C. 154(b) by 51 days.

(21) Appl. No.: 13/743,924

(22) Filed: Jan. 17, 2013

(65) Prior Publication Data
US 2014/0027984 A1    Jan. 30, 2014

Related U.S. Application Data

(60) Provisional application No. 61/588,346, filed on Jan. 19, 2012.

(51) Int. Cl.
*F16J 15/32*    (2006.01)
*F16J 15/16*    (2006.01)

(52) U.S. Cl.
CPC .............. *F16J 15/164* (2013.01); *F16J 15/322* (2013.01); *F16J 15/3228* (2013.01)
USPC ............................ 277/572; 277/549; 277/551

(58) Field of Classification Search
USPC ................... 277/549, 551, 558, 562, 568, 572
See application file for complete search history.

(56) References Cited

U.S. PATENT DOCUMENTS

| | | | |
|---|---|---|---|
| 2,192,305 | A | 3/1940 | Gilman |
| 2,395,107 | A | 2/1946 | Dodge |
| 2,471,679 | A | 5/1949 | Gardner |
| 3,606,348 | A | 9/1971 | Taylor |
| 4,094,512 | A | 6/1978 | Back |
| 4,375,291 | A | 3/1983 | Padgett |
| 5,171,024 | A | 12/1992 | Janocko |
| 6,485,256 | B1 | 11/2002 | Iketani |

(Continued)

FOREIGN PATENT DOCUMENTS

| | | |
|---|---|---|
| FR | 2 121 058 | 8/1972 |
| FR | 2 295 321 | 7/1976 |

(Continued)

OTHER PUBLICATIONS

The International Search Report and Written Opinion of the International Searching Authority for PCT/US2013/021907, date completed Sep. 24, 2013, date mailed Oct. 2, 2103.

*Primary Examiner* — Gilbert Lee
(74) *Attorney, Agent, or Firm* — Miller, Canfield, Paddock and Stone; Mark L Maki

(57) ABSTRACT

An abeyance seal includes a polymer actuation ring, which defines a flexible sealing lip normally spaced from the shaft. When subjected to leakage, this element collapses against the shaft and forms an initial sealing. Secondarily, a metal sealing/anti-extrusion ring provides a second seal during leakage. The polymer ring provides the initial sealing function during leakage at low differential pressure, and once the polymer ring seals to the shaft, increased sealed pressure loads the polymer ring against the metal sealing/anti-extrusion ring causing it to deform so that the metal ring comes into contact with the shaft to form a second seal.

20 Claims, 6 Drawing Sheets

(56) References Cited

U.S. PATENT DOCUMENTS

| | | | |
|---|---|---|---|
| 6,712,580 B2 | 3/2004 | Iketani | |
| 7,780,172 B2 * | 8/2010 | Ashida et al. | 277/560 |
| 8,052,153 B2 * | 11/2011 | Ebihara et al. | 277/572 |
| 2002/0089125 A1 * | 7/2002 | Hosokawa et al. | 277/572 |
| 2006/0208428 A1 * | 9/2006 | Oiyama et al. | 277/551 |
| 2011/0285092 A1 * | 11/2011 | Ebihara et al. | 277/572 |

FOREIGN PATENT DOCUMENTS

| | | |
|---|---|---|
| JP | 04316766 | 11/1992 |
| WO | WO 2011/092111 | 8/2011 |

\* cited by examiner

ABEYANCE SEAL FOR HIGH TEMPERATURE, HIGH PRESSURE APPLICATIONS

CROSS REFERENCE TO RELATED APPLICATIONS

This application asserts priority from provisional application 61/588,346, filed on Jan. 19, 2012 which is incorporated herein by reference.

FIELD OF THE INVENTION

The invention relates to an abeyance seal for high temperature, high pressure applications such as in nuclear coolant pumps.

BACKGROUND OF THE INVENTION

There are a variety of mechanical seal designs available for nuclear primary coolant pumps. The function of these mechanical seals is to restrict the leakage of hot, high pressure reactor coolant system (RCS) water from the reactor primary system into the reactor containment vessel, while allowing a rotating shaft to penetrate the primary pressure boundary. The shaft drives a pump impeller, and the mechanical seal is located along the shaft in a seal chamber. These pumping systems require cooling to the mechanical seal in order to provide the kind of operating environment for the seal that will enable optimum performance. Conditions in these pumping systems may be as high as 2500 psi and 650 F, and it is necessary to ensure adequate life for the seal under these conditions by the provision of a cooling system that cools the mechanical seal.

Under emergency conditions where electrical power or control may be lost to the cooling system, seal cooling may be lost and excessive high temperatures at the seal faces would occur. This high temperature may cause the seals to be compromised due to a variety of reasons leading to a possibility of greatly increased RCS leakage to the reactor containment vessel.

It is an object of the invention, therefore, to provide a safety backup seal (abeyance seal) that actuates under specified conditions of leakage, such as during loss of the cooling system, and thereby maintains a leak tight seal against full RCS conditions at the seal for the duration of the emergency.

One other design concept is disclosed in a Westinghouse patent (Application US 2010/0150715 A1). This patent discloses a thermally actuated backup seal for a nuclear power plant that requires an elevated temperature in the range of 250 to 290 F to melt a spacer or wax filled piston, wherein melting of such structure then allows a retaining pin to retract allowing a split piston ring to collapse against the shaft. Further pressure and temperature increases result in a secondary polymer ring to also engage the shaft to provide even lower leakage than what would be provided by the first metal split ring, which might leak due to the gap of the split. The solid polymer ring is located downstream from the split ring.

This design, however, embodies various disadvantages. For example, it may take up to 45 seconds after the temperature of activation is reached (250-290 F) to actuate, wherein significant amounts of steam could escape before actuation occurs.

Further, this design can be inadvertently actuated by momentary loss of cooling in non-accident (including hot standby) conditions, and it may be difficult or impossible to determine if it is actuated, and if inadvertent actuation is not discovered, the seal may not be available for a subsequent true emergency.

Also, the seal can be actuated under rotation by any deficiencies of its companion primary seal, and if the seal actuates during shaft rotation, the seal will damage itself and/or the rotating components due to the rubbing and possible seizing of the metal piston ring, which may result in leakage far above the leakage rates identified in testing.

Still further, the seal provides no protection to gross liquid leakage and full actuation does not provide zero-leakage. At 2250 psi and 575 F the leakage is reported in the patent application to be on the order of 0.1 gal/min. If extended accident scenarios up to 168 hours occur, erosion of the sealing ring may significantly increase leakage beyond these values.

Additionally, the downstream polymer element has to be able to seal a 0.050" radial gap between the housing flange and shaft. It is well understood that at temperatures above 600 F the element material has a potential to flow which would result in a loss of sealing capability due to extrusion.

More particularly as to the invention, the invention is believed to overcome the disadvantages associated with prior seal designs. The invention is an abeyance seal which comprises the following:

Metal Thermal Expansion Preventer (TEP): The TEP mounts with a seal housing radially adjacent to the shaft and has an interference fit to a metal sealing/anti-extrusion ring to facilitate a unitized assembly. The TEP provides a limiting restriction on the horizontal (axial sealing portion) lip of the polymer actuation ring. Since the coefficient of thermal expansion for the polymer actuation ring is much greater than for metal components, the TEP prevents the polymer material from growing away from the shaft or shaft sleeve, thereby maintaining a constant and controlled gap between the rotating and stationary components under elevated temperature conditions. Also as part of this ring are a number of openings in the front face (high pressure side) located at or below the centroid of the polymer actuation ring and a tapered front edge where it also mates with the polymer actuation ring. These two features facilitate the actuation process under high vapor and or two-phase flow velocities due to mass momentum.

Polymer Actuation Ring: This device is the first line of sealing actuation. Because it is made of a flexible polymer compound, when subjected to leakage this element will rotate about its centroid, collapsing against the shaft or shaft sleeve and forming the initial sealing function between the rotating and stationary components (see FIG. 2). This action is the result of the application of the Bernoulli Effect where a small differential pressure is caused by increased leakage through the gap between the horizontal portion of the polymer ring and the shaft or shaft sleeve. This is further aided by the aforementioned fluid impingement due to momentum of leakage flow directed through the openings in the TEP ring below the centroid of the polymer ring. Once the sealing lip begins to contract towards the shaft or shaft sleeve, the differential pressure is further exaggerated resulting in the lip accelerating in its closing action. Once the gap starts to close between the lip and shaft or shaft sleeve, full actuation has been shown, through testing, to occur in less than one second. Once the polymer ring seals to the shaft or shaft sleeve the differential pressure across the abeyance seal begins to rise rapidly. FIG. 3 shows the condition of the polymer ring at 100 psi.

The polymer ring further seals at the shaft or shaft sleeve and also at its outside diameter against the metal sealing/anti-extrusion ring and thermal expansion preventer (TEP) ring. This deformation of the polymer ring is further facilitated by the fact that the outside diameter of the ring is unconstrained. If the OD were constrained the ring becomes stiffer raising the internal stress at the constrained region and reducing the actuation capability. Actuation of this element will occur at significantly lower leakage flows due to high velocity steam, two phase flow, or gas. Much higher flows of liquid water will pass through before actuation occurs.

Metal Sealing/Anti-Extrusion Ring: The metal sealing/anti-extrusion ring has an interference fit to the metal backing ring. This interference fit is performed before the polymer actuation ring and TEP ring are installed. This again is done to provide a unitized assembly, as well as to seal the metal sealing/anti-extrusion ring to the metal backing ring. From a function standpoint, the polymer ring is to provide the initial sealing function due to leakage at low differential pressure (e.g. less than 10 psid). Once the polymer ring seals to the shaft or shaft sleeve, increased sealed pressure that would result loads the polymer ring against the metal sealing/anti-extrusion ring causing it to deform, rotating so that the inside diameter of the metal ring comes into contact with the shaft or shaft sleeve. The metal ring will come into full contact with the shaft or shaft sleeve at pressures less than 1000 psi (see FIG. 4). The anti-extrusion ring now forms an additional sealing function and also prohibits the polymer ring from extruding at higher pressures and temperatures. Because the polymer ring cannot extrude, it now is able to assist in further leak tight sealing under higher pressure and temperatures. FIG. 5 shows the complete sealing of this arrangement at 2500 psi and 500 F. The metal sealing/anti-extrusion ring is constructed as a separate component to facilitate manufacture of the thin section. If alternatively the metal sealing/anti-extrusion ring and the metal backing ring were formed as one piece, the function would be the same.

Metal Backing Ring: Provides a support component to the Metal sealing/anti-extrusion ring.

ADVANTAGES

The following advantages for this sealing arrangement are outlined below:

Seal actuation is not dependent on temperature but on actual leakage flow. If no steam leakage is present or there is very low steam leakage, actuation will not take place unless liquid leakage flow is significantly higher. Unlike a reliance on actuation due to elevated temperatures, there is no risk of unintended actuation due to temporary circumstances such as momentary loss of cooling water, or the concurrent risk that an inadvertently actuated seal will be damaged by continued pump operation and be unavailable in the event of a true emergency.

Experiments performed showed that it was possible to actuate the abeyance seal when a rate of approximately 1 lbm/sec steam flow was reached. Seal actuation will not occur under normal liquid leakage flow. Experiments were performed with the selected configuration to verify that water flows up to 9 gal/min (the maximum available for the particular test setup) will not actuate the seal. This is an important design advantage. Under conditions where a primary mechanical seal has begun to deteriorate and leakage has increased but seal injection, seal cooling, and RCS makeup capacity are still available, there would be no urgent need to shut the pump down since there is ample capability to handle the extra leakage until an orderly shutdown is arranged.

Device sealing to the shaft is provided by both metal and polymer elements working in concert to provide a leak tight seal at pressures up to 2500 psi and 575° F.

The polymer ring is upstream of the metal sealing ring making it impossible to extrude. Elevated temperatures and pressures facilitate the conforming of the polymer to a variety of imperfections in shaft condition. Even at temperatures above 600 F, where possible flow of the material could occur, will not hinder the performance of the material in the way it is being used. On the contrary, the polymer material will conform even more, providing more sealing capability.

Since the device actuates on leakage by design, no operator intervention or other support systems are required to initiate or maintain the seal, so long as there is pressure to be sealed.

Seal actuation is repeatable, and can be tested as manufactured, or possibly after full cartridge installation by applying low pressure air to the chamber between the upper seal and abeyance seal. The abeyance seal will actuate and then when the pressure is removed, will open back up with no damage to the abeyance seal components.

Only two components of this assembly exceed their yield strength by design under full pressure and temperature: the metal sealing/anti-extrusion ring and polymer actuation ring. After pressure is reduced, the metal ring will spring back sufficiently to provide some clearance to the shaft. Although the polymer ring will not spring back, load against the shaft will be minimal. These two factors result in ease of removal of the assembly.

Since this device actuates under conditions of high velocity leakage, this concept could also be utilized in other industries other than nuclear power, with specific advantages in those involved with the transport of high pressure light hydrocarbons which are vapor at atmospheric conditions and any other high pressure liquid which is gaseous at atmospheric conditions.

Other objects and purposes of the invention, and variations thereof, will be apparent upon reading the following specification and inspecting the accompanying drawings.

Figure 1:
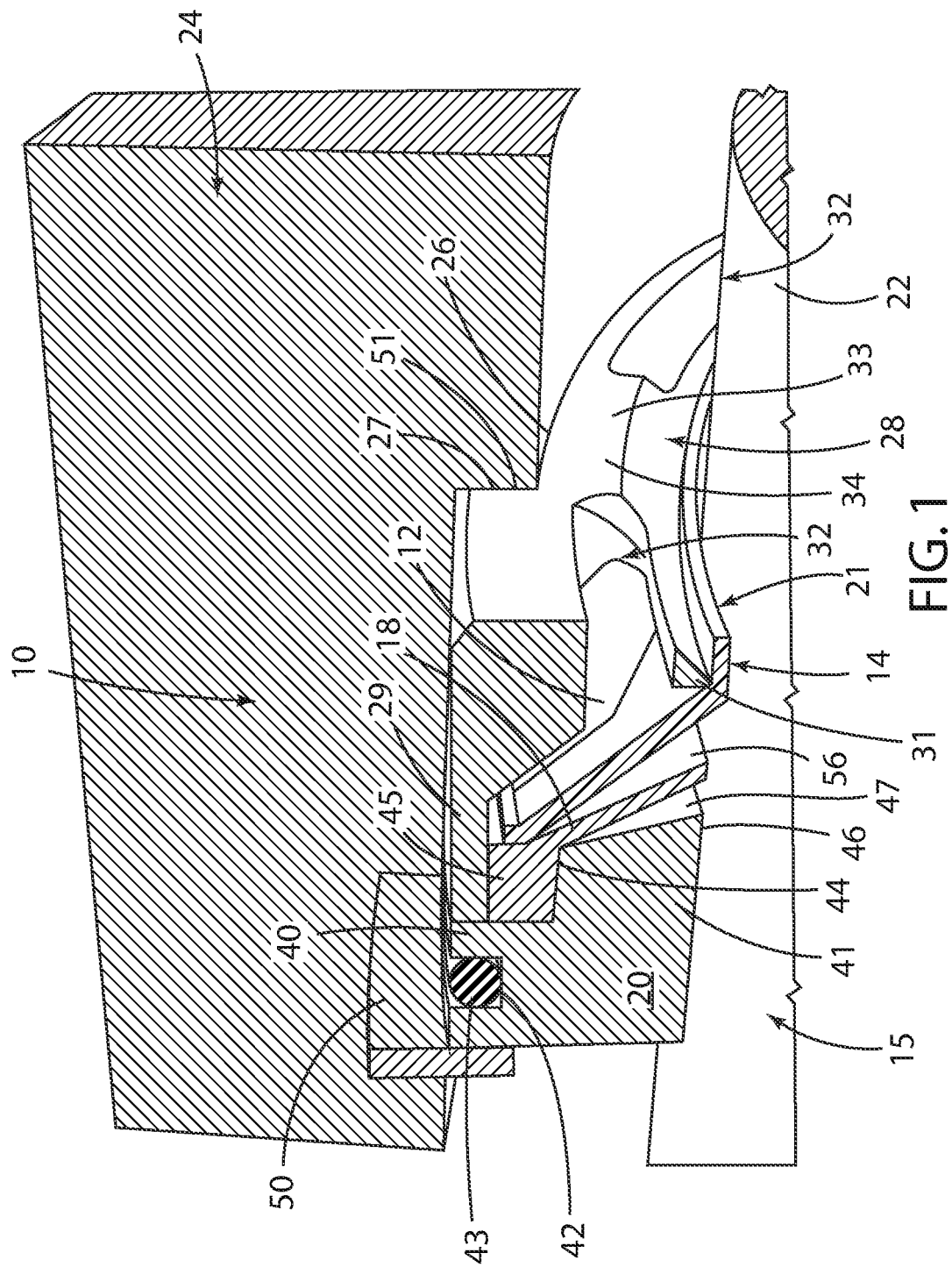
FIG. 1 is a basic abeyance seal assembly.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, an abeyance seal 10 is provided in combination with a primary mechanical seal to prevent leakage to environment past the mechanical seal. This abeyance seal 10 is particularly suitable for high temperature, high pressure applications such as in nuclear coolant pumps.

Figure 2:
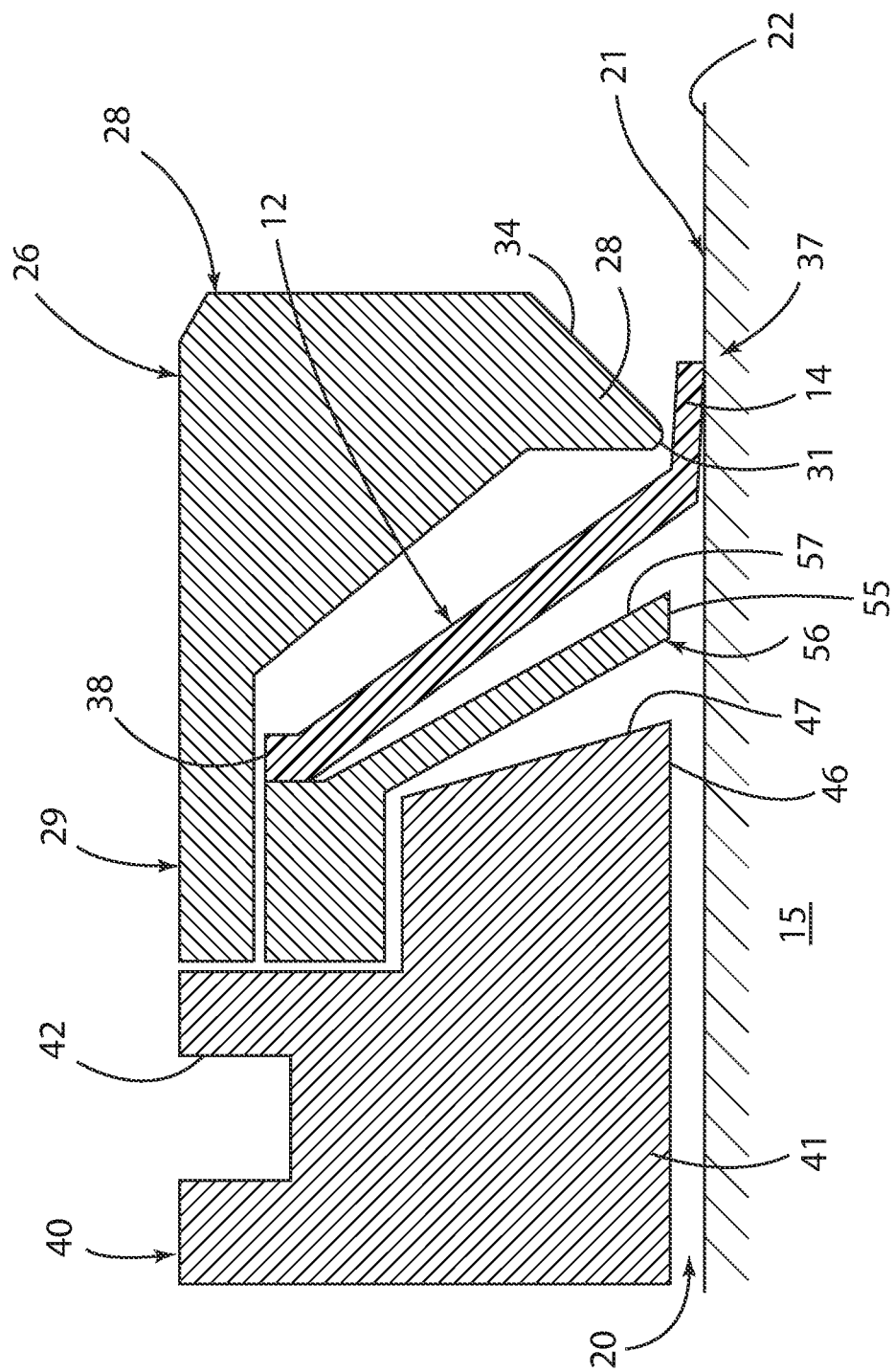
FIG. 2 is an initial polymer lip sealing

Generally, as to the seal components, the abeyance seal 10 includes a polymer actuation ring 12, which is the first line of sealing actuation and defines a flexible sealing lip 14 normally spaced from the shaft or shaft sleeve 15. When subjected to leakage, the actuation ring 12 collapses with the lip 14 abutting against the shaft or shaft sleeve 15 and forms an initial sealing (as seen in FIG. 2). Actuation of the actuation ring 12 occurs at lower leakage flows due to high velocity steam, two phase flow, gas or any other similar cause.

Figure 3:
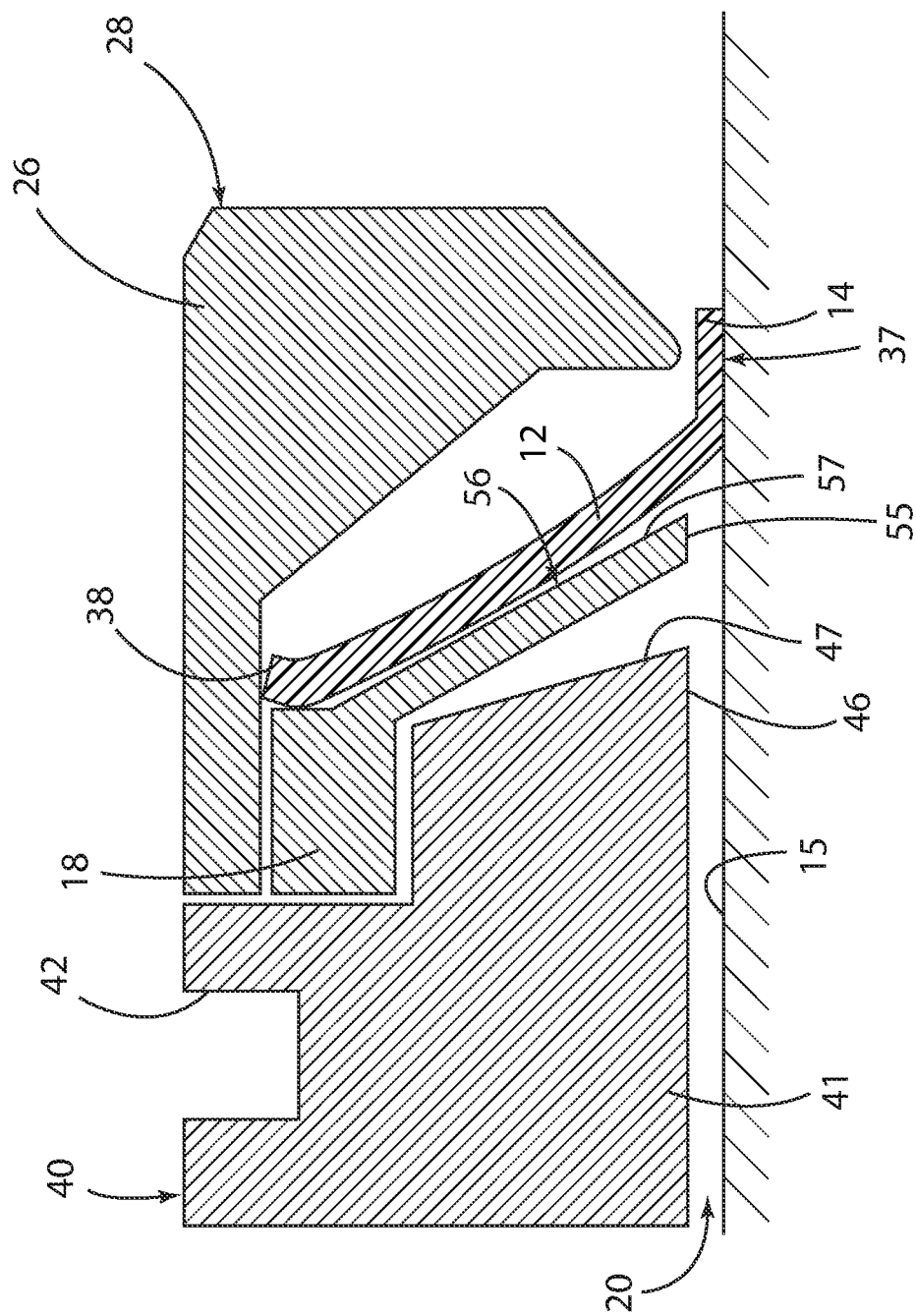
FIG. 3 is a polymer sealing at 100 psi
Figure 4:
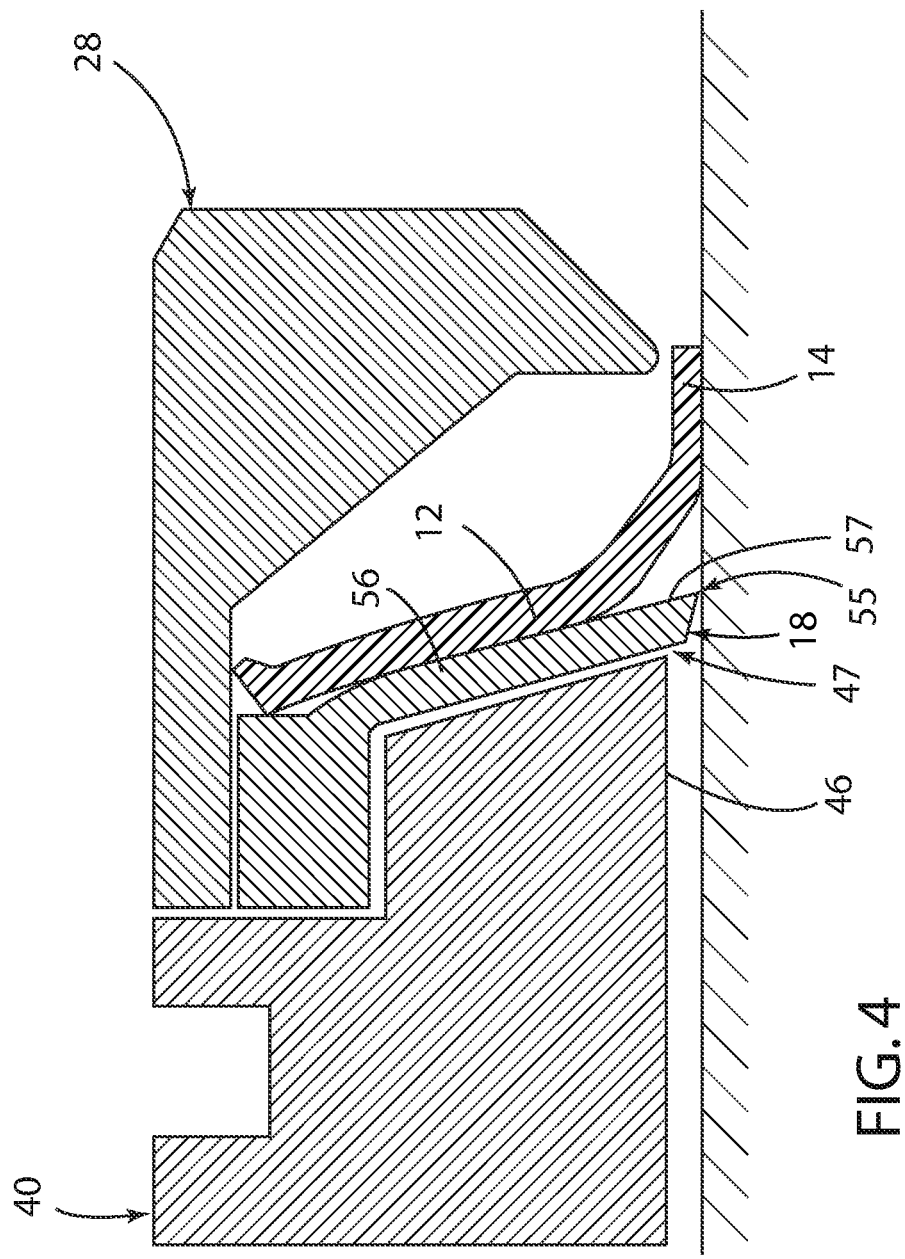
FIG. 4 is an anti-extrusion ring sealing to shaft.

Secondarily, a metal sealing/anti-extrusion ring 18 is provided to form a second seal during leakage. The actuation ring 12 provides the initial sealing function during leakage at low differential pressure (e.g. less than 10 psid), and once the actuation ring 12 seals to the shaft or shaft sleeve 15 (as seen in FIG. 3), increased sealed pressure serve to load the polymer actuation ring 12 against the metal sealing/anti-extrusion ring 18 (as seen in FIG. 4) causing it to deform so that the inside diameter of the metal ring 18 comes into contact with the shaft or shaft sleeve 15 to form a second seal axially adjacent to the first seal defined by the lip 14.

One advantage of this abeyance seal 10 is that seal actuation is not dependent on temperature but on actual leakage flow. If no steam leakage is present or there is very low steam leakage, actuation will not take place unless liquid leakage flow is significantly higher.

The abeyance seal 10 is usable with a variety of mechanical seal designs which are currently available for nuclear primary coolant pumps although the abeyance seal 10 is not necessarily limited to this specific type of pump of the environment thereof. Nevertheless, in this environment, the function of the primary mechanical seals is to restrict the leakage of hot, high pressure reactor coolant system (RCS) water from the reactor primary system into the reactor containment vessel, while allowing the rotating shaft 15 to penetrate the primary pressure boundary. The shaft 15 may or may not have a shaft sleeve but for purposes of this disclosure, the reference to a shaft applies to a shaft with or without a shaft sleeve. When rotating, the shaft drives a pump impeller.

The mechanical seal is located along the shaft 15 in a seal chamber to seal an inboard process side of the mechanical seal where the impeller is located, from an outboard side which typically opens to atmosphere. The outboard side is shown in FIG. 1 and is designated by reference numeral 20, wherein the abeyance seal 10 would be located along the shaft 15 on the outboard side of the mechanical seal, which also is mounted to the same shaft 15. As will be understood, the abeyance seal 10 normally does not define a seal during normal operating conditions but defines an annular gap 21 formed radially between the lip 14 of the actuation ring 12 and the opposing surface 22 of the shaft 15. Thus, a mechanical seal in some typical configurations would normally be in open communication on the outboard side with exterior atmosphere. However, in the absence of the abeyance seal 10, the open gap would also allow for high pressure fluid that leaks past the mechanical seal during seal failure to also leak to atmosphere. To avoid this result, the abeyance seal 10 would close under these conditions and quickly stop this leakage to atmosphere.

As to the nuclear coolant pumps, these pumping systems require cooling to the mechanical seal in order to provide the kind of operating environment for the mechanical seal that will enable optimum performance and continuous sealing. Conditions in these pumping systems may be as high as 2500 psi and 650 F, and it is necessary to ensure adequate life for the mechanical seal under these conditions by the provision of a cooling system that cools the mechanical seal.

Under emergency conditions where electrical power or control may be lost to the cooling system, seal cooling may be lost and excessive high temperatures at the seal faces of the seal rings in the mechanical seal would occur. This high temperature may cause the mechanical seals to be compromised due to a variety of reasons leading to a possibility of greatly increased RCS leakage to the reactor containment vessel.

More particularly as to the abeyance seal 10, the abeyance seal 10 can be provided in combination with any mechanical seal design and the skilled artisan is well versed in such mechanical seals such that a detailed description thereof is not required. Generally, for both the mechanical seal and the abeyance seal 10, a fluid seal is formed to seal the radial space between the shaft surface 22 and an opposing inside surface of a stationary seal structure, generally identified herein as the seal housing 24. While the mechanical seal would include a housing, such as a seal gland, the housing 24 for the abeyance seal 10 may be formed integral with the existing seal gland or as an add-on component mounted to the seal gland.

To effectively seal the radial space between the shaft surface 22 and the seal housing 24, the abeyance seal 10 preferably is formed of a unitized assembly of components which mounts to the seal housing 24 and is disposed in the radial space 20 between the shaft 15 and housing 24. The abeyance seal 10 comprises the following components and structures:

Metal Thermal Expansion Preventer (TEP) 26: The TEP 26 fits within an annular notch 27 of the housing 24 and is comprised of an inboard flange section 28 and an outboard annular wall 29. The annular wall 29 has a radially inward facing surface which defines an interference fit with the metal sealing/anti-extrusion ring 18 which frictionally fits radially within the annular wall 29 to facilitate a unitized assembly.

Figure 6:
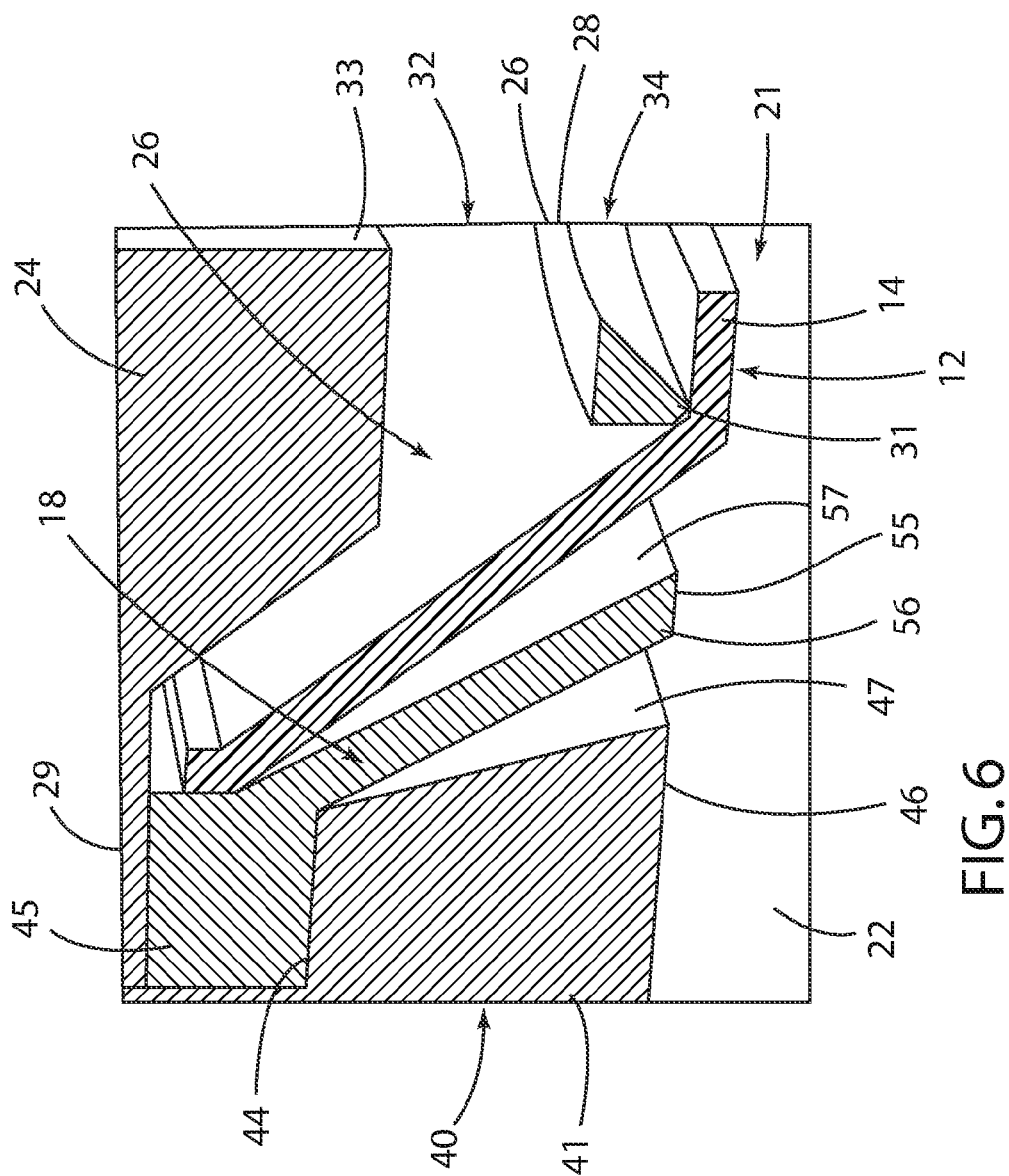
FIG. 6 is an enlarged partial view of the abeyance seal of FIG. 1.

In addition to the wall 29 being provided to carry and support the metal ring 18, the flange section 28 of the TEP 26 provides a limiting restriction on the horizontal (axial sealing portion) lip 14 of the polymer actuation ring 12. The flange section 28 comprises an annular edge portion 31 which preferably has a V-shaped cross section as seen in FIGS. 1 and 6 which radially limits or restricts radial movement of the lip 14 outwardly away from the shaft 15 and therefore, radially locates the lip 14 at a fixed maximum distance away from the shaft surface 22. Further, the edge portion 31 can also limit axial movement of the lip 14 in the inboard direction toward the mechanical seal.

Since the coefficient of thermal expansion for the polymer actuation ring 12 is much greater than for metal components, the TEP 26 prevents the polymer material of the actuation ring 12 from growing away from the shaft or shaft sleeve 15, thereby maintaining a constant and controlled gap 21 between the rotating and stationary components under elevated temperature conditions. Also as part of the TEP 26, the flange section 28 includes a number of openings 32 in the front face 33 (high pressure side) located at or below the centroid of the polymer actuation ring 12 and a tapered front edge 34 where it also mates with or contacts the polymer actuation ring 12 and the lip 14 thereof. These two features of the openings 32 and tapered front edge 34 facilitate the actuation process under high vapor and or two-phase flow velocities due to mass momentum.

Polymer Actuation Ring 12: This device is the first line of sealing actuation. While the actuation ring 12 is preferably a polymer, it will be understood that this element may be made of other materials that prove to provide suitable structure and function.

Because it is preferably made of a flexible polymer compound, when subjected to leakage this element 12 will rotate about its centroid, collapsing radially inwardly against the shaft or shaft sleeve 15 to form the initial sealing function between the rotating and stationary components (see FIG. 2). This action is the result of the application of the Bernoulli Effect where a small differential pressure is caused by increased leakage through the gap 21 between the horizontal portion or lip 14 of the polymer ring 12 and the shaft or shaft sleeve 15. This collapsing effect is further aided by the aforementioned fluid impingement due to momentum of the leakage flow that is directed through the openings 33 in the flange section 28 of the TEP ring 26 below the centroid of the polymer ring 12. Once the sealing lip 14 begins to contract radially inwardly towards the shaft or shaft sleeve 15 as shown in FIG. 2, the differential pressure is further exaggerated resulting in the lip 14 accelerating in its closing action to the fully closed position shown in FIG. 3. Once the gap 21 starts to close between the lip 14 and shaft or shaft sleeve 15, full actuation has been shown, through testing, to occur in less than one second. Once the polymer ring 12 seals to the shaft or shaft sleeve 15 the differential pressure across the abeyance seal 10 begins to rise rapidly. FIG. 3 shows the condition of the polymer ring at 100 psi.

As leakage pressure increases as seen in FIG. 3, the polymer ring 12 further seals at the shaft or shaft sleeve 15 through increased contact force at location 37 and also seals at its outside diameter 38 against the metal sealing/anti-extrusion ring 18 and the thermal expansion preventer ring 26. This deformation or flexing of the polymer ring 12 is further facilitated by the fact that the outside diameter (OD) 38 of the ring 12 is unconstrained. If the OD 38 were constrained the ring 12 becomes stiffer raising the internal stress at the constrained region and reducing the actuation capability. However, as a result of the unconstrained OD 38 as well as the lack of axial constraint at the ID contact location 37 as defined at lip 14, actuation of this element 12 will occur at significantly lower leakage flows generated by high velocity steam, two phase flow, or gas. Much higher flows of liquid water will pass through before actuation occurs.

Metal Sealing/Anti-Extrusion Ring: The next component is the metal sealing/anti-extrusion ring 18 which has an interference fit engaged to a metal backing ring 40. The metal backing ring 40 has an annular body 41 which defines a groove 42 that receives an O-ring 43 (FIG. 1) which Oring 43 seals the abeyance seal 10 against the housing 24. The front of the body 41 also includes a mounting shoulder 44 which frictionally engages the metal ring 18 between the radially outward facing surface of the shoulder 44 and the opposing inward facing surface of the metal ring 18, and specifically, the ring flange 45 thereof. The ring body 41 further projects forwardly to define a nose 46 that defines an inclined sealing face 47 which faces axially in the inboard direction.

The interference fit at the shoulder 44 is performed before the polymer actuation ring 12 and TEP ring 26 are installed. For illustrative purposes, a white line is shown between the ring flange 45 and the three sides thereof facing the shoulder 44 (on the inside and back end) and the wall 29 (on the outside). It will be understood that this white line is shown for clarity and that actual close fitting contact would exist between these opposing surfaces to define the interference fits therebetween.

The interference fit of the shoulder 44 again is done to provide a unitized assembly, as well as to seal the shoulder interface between the ring flange 45 of the metal sealing/anti-extrusion ring 18 and the metal backing ring 40. Further, sealing is defined between the backing ring 40 and the housing 24 by the aforementioned O-ring 43 which O-ring 43 allows the unitized seal assembly to be slid axially into the radial chamber between the shaft 15 and the housing 24. After installation, the abeyance seal assembly is axially fixed in place by a snap ring 50 (FIG. 1) so that the abeyance seal 10 is confined axially between the snap ring 50 and the housing shoulder 51 defined by the notch 27.

From a functional standpoint, the polymer ring 12 is to provide the initial sealing function due to leakage at low differential pressure (e.g. less than 10 psid). Once the polymer ring 12 seals to the shaft or shaft sleeve 15 as seen in FIG. 3, increased sealed pressure that would result during emergency or other similar conditions serves to load the polymer ring 12 which deforms against the metal sealing/anti-extrusion ring 18 (see FIG. 3) thereby causing the metal ring 18 to also deform under the increasing leakage pressure. This ring deformation rotates the metal ring 18 (see FIG. 4) so that the inside diameter 55 of the metal ring 18 comes into radial contact with the shaft or shaft sleeve 15. The metal ring 18 will come into full contact with the shaft or shaft sleeve 15 at pressures less than 1000 psi (see FIG. 4).

This inside diameter 55 is defined at the terminal end of a sealing flange 56. Normally, the sealing flange 56 extends at a first inclined angle shown in FIGS. 1-3 and 6, and then deforms in a swinging movement to the second fully-deflection angle shown in FIGS. 4 and 5. This second angle is limited by the point at which the sealing flange 56 abuts axially against the inclined face 47 of the backing ring 40 and radially against the shaft 15 as seen in FIG. 5.

Figure 5:
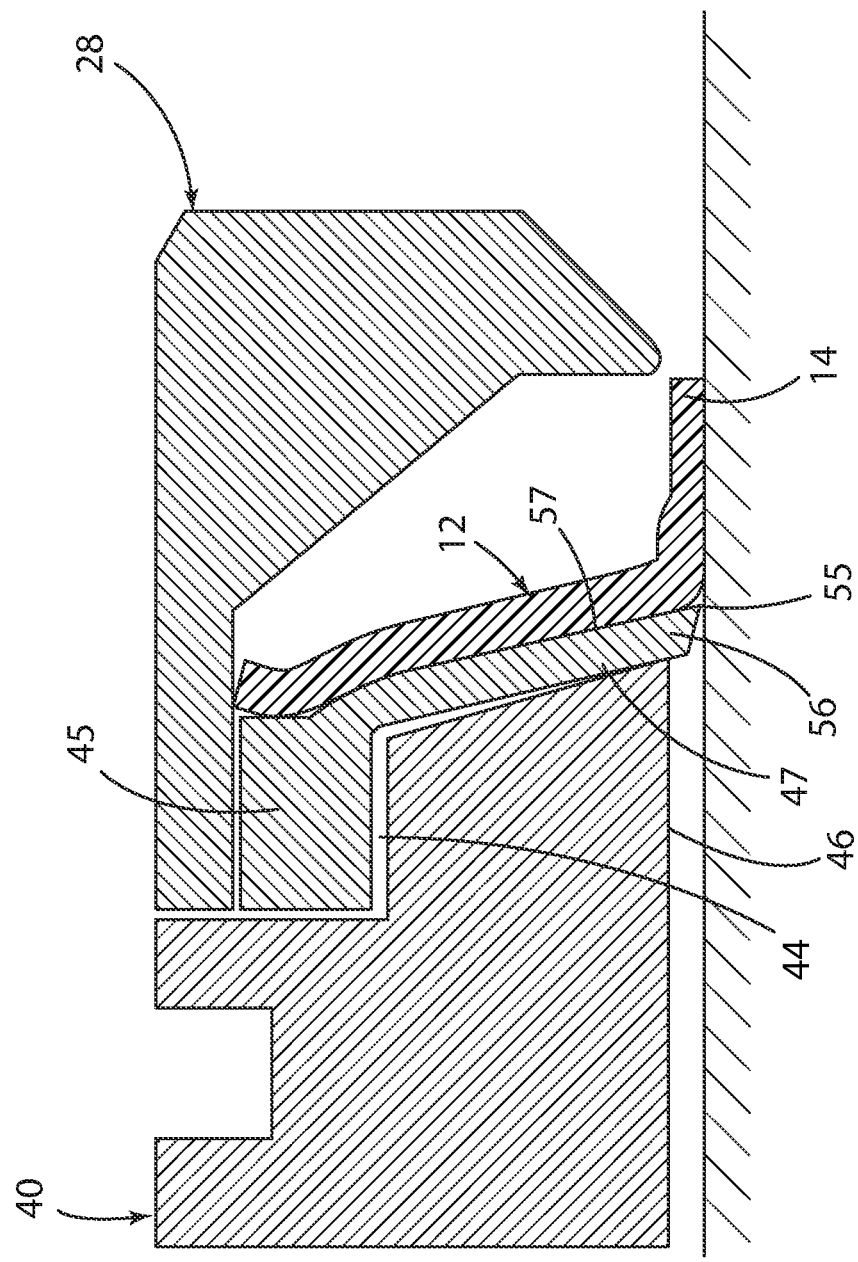
FIG. 5 is a complete leak-tight sealing at 2500 psi and 500 F.

The anti-extrusion ring 18 now forms an additional sealing function through the contact of the inside diameter 55 with the shaft surface 21, and also prohibits the polymer ring 12 from extruding at higher pressures and temperatures as shown in FIG. 5. Because the polymer ring 12 cannot extrude axially in the outboard direction due to its abutment with the opposing face 58 of the sealing flange 56, it now is able to assist in further leak tight sealing under higher pressure and temperatures. FIG. 5 shows the complete sealing of this arrangement at 2500 psi and 500 F. The metal sealing/anti-extrusion ring 18 is constructed as a separate component to facilitate manufacture of the thin section defining the sealing flange 56. If alternatively the metal sealing/anti-extrusion ring 18 and the metal backing ring 40 were formed as one piece, the function would be the same.

Metal Backing Ring: As described above, the backing 40 provides a support component to the metal sealing/anti-extrusion ring 18 and serves to mount the unitized assembly within the seal housing 24.

The above-described abeyance seal provides a number of advantages. The following advantages for this sealing arrangement include the following.

For example, seal actuation is not dependent on temperature but on actual leakage flow. If no steam leakage is present or there is very low steam leakage, actuation will not take place unless liquid leakage flow is significantly higher. Unlike a reliance on actuation due to elevated temperatures which is found in the prior art, there is no risk of unintended actuation due to temporary circumstances such as momentary loss of cooling water, or the concurrent risk that an inadvertently actuated abeyance seal will be damaged by continued pump operation and be unavailable in the event of a true emergency.

Experiments performed showed that it was possible to actuate the abeyance seal 10 when a rate of approximately 1 lbm/sec steam flow was reached. However, seal actuation will not occur under normal liquid leakage flow which might occur during normal pump and seal operation. Experiments were performed with the selected configuration of the abeyance seal 10 to verify that water flows up to 9 gal/min (the maximum available for the particular test setup) will not actuate the seal 10. This is one important design advantage. Under conditions where a primary mechanical seal has begun to deteriorate and leakage has increased but seal injection, seal cooling, and RCS makeup capacity are still available, there would be no urgent need to shut the pump down since there is ample capability to handle the extra leakage until an orderly shutdown is arranged.

In a further example, device sealing to the shaft 15 is provided by both the metal and polymer elements, namely the metal ring 18 and the polymer ring 12, which elements work in concert to provide a leak tight seal at pressures up to 2500 psi and 575 F. In this regard, the polymer ring 12 is upstream of the metal sealing ring 18, i.e. on the inboard leakage side, making it impossible to extrude the polymer ring 12 under high pressures. Elevated temperatures and pressures facilitate the conforming of the polymer to a variety of imperfections in shaft condition. Even at temperatures above 600 F, where possible flow of the polymer material could occur, these high temperatures will not hinder the performance of the polymer material in the way it is being used and constrained by the sealing flange 56. On the contrary, the polymer material will conform even more, providing more sealing capability.

In a further example, since the device actuates on leakage by design, no operator intervention or other support systems are required to initiate or maintain the seal, so long as there is pressure to be sealed.

Also for example, seal actuation is repeatable, and can be tested as manufactured, or possibly after full cartridge installation by applying low pressure air to the chamber between the upper seal and Abeyance seal. The abeyance seal 10 will actuate and then when the pressure is removed, will open back up with no damage to the Abeyance Seal Components so that the abeyance seal 10 continues to be functional through repeated use.

Still further, only two components of this assembly exceed their yield strength by design under full pressure and temperature: the metal sealing/anti-extrusion ring 18 and the polymer actuation ring 12 which are formed of resiliently deformable materials. After pressure is reduced, the metal ring 18 will spring back sufficiently to provide some clearance to the shaft 15. Although the polymer ring 12 typically will not spring back, load against the shaft will be minimal. These two factors result in ease of removal of the assembly.

Since this device actuates under conditions of high velocity leakage, this concept could also be utilized in other industries other than nuclear power, with specific advantages in those involved with the transport of high pressure light hydrocarbons which are vapor at atmospheric conditions and any other high pressure liquid which is gaseous at atmospheric conditions.

Although a particular preferred embodiment of the invention has been disclosed in detail for illustrative purposes, it will be recognized that variations or modifications of the disclosed apparatus, including the rearrangement of parts, lie within the scope of the present invention.

What is claimed:

1. An abeyance seal which prevents leakage of sealed fluid to environment along a rotatable shaft and radially opposed housing, said abeyance seal comprising:

a polymer actuation ring, which provides a first seal against a shaft surface during leakage, said actuation ring comprising a flexible sealing lip and projecting radially inwardly such that said sealing lip is normally spaced from the shaft surface, said actuation ring having opposite first and second sides facing axially in inboard and outboard directions, said actuation ring resisting deformation when subjected to a first fluid pressure of sealed fluid acting on said inboard first side of said actuation ring, and said actuation ring being deformable radially inwardly when subjected to a second fluid pressure of sealed fluid greater than said first fluid pressure so as to collapse against the shaft surface to initially form the first seal by said settling lip contacting the shaft surface; and a metal sealing/anti-extrusion ring which provides a second seal during leakage, said metal ring including a sealing flange which projects radially inwardly so as to be normally spaced from the shaft surface when subjected to said first and second pressures, and is disposed axially adjacent to said actuation ring on said outboard second side, said sealing flange being stiffer than said actuation ring so as to be deformable against the shaft surface under increased sealed pressure loads generating a third fluid pressure of sealed fluid greater than said second fluid pressure, the polymer ring being pressed against the metal ring after deformation causing said metal ring to also deform so that an inside diameter of the metal ring comes into contact with the shaft surface to form the second seal.

2. The abeyance seal according to claim 1, wherein said actuation ring and said metal ring are axially spaced when undeformed.

3. The abeyance seal according to claim 2, wherein said second side of said actuation ring is spaced from said metal ring when undeformed and abuts against said metal ring when said actuation ring is deformed by said second fluid pressure.

4. The abeyance seal according to claim 1, wherein said metal ring extends axially and radially to pivot into contact with said shaft surface when deformed by said third fluid pressure.

5. The abeyance seal according to claim 4, wherein said actuation ring includes a radial portion defined by radially-spaced outside and inside diameters and said sealing lip extending axially from said inner diameter, said inside diameter being greater than a shaft diameter defined by the shaft surface.

6. The abeyance seal according to claim 5, wherein said sealing lip extends axially away from said metal ring in said inboard direction.

7. The abeyance seal according to claim 1, wherein said actuation ring is defined by radially-spaced outside and inside diameters, said inner diameter being greater than a shaft diameter defined by the shaft surface to define a radial gap between said sealing lip of said actuation ring and said shaft surface when said actuation ring is undeformed.

8. The abeyance seal according to claim 7, wherein said outside diameter of said actuation ring is unconstrained within said abeyance seal to facilitate deformation of said actuation ring.

9. The abeyance seal according to claim 7, wherein said abeyance seal includes an expansion preventer having an annular flange surrounding said sealing lip to limit radial expansion of said sealing lip and said inside diameter.

10. An abeyance seal which prevents leakage of sealed fluid along an outer shaft surface of a rotatable shaft and a radially opposed housing, said abeyance seal comprising:

an actuation ring, which provides a first shaft seal against the shaft surface during leakage, said actuation ring projecting radially inwardly from an outside diameter and defining a sealing lip on an inside diameter wherein said sealing lip is normally spaced radially from the shaft surface to define a radial gap therebetween, said actuation ring having opposite first and second sides facing axially in inboard and outboard directions, said actuation ring having a resilient flexibility which resists deformation when subjected to a first fluid pressure of sealed fluid acting on said inboard first side of said actuation ring, while permitting deformation radially inwardly when subjected to a second fluid pressure of sealed fluid greater than said first fluid pressure, said flexibility of said actuation ring permitting said sealing lip to collapse against the shaft surface to initially form the first shaft seal when subjected to said second fluid pressure; and an anti-extrusion ring which has a greater rigidity than said actuation ring and provides a second shaft seal during leakage, said anti-extrusion ring including a sealing flange which projects radially inwardly so as to be normally spaced from the shaft surface at said first and second pressures, and is disposed axially adjacent to said actuation ring on said outboard second side, said sealing flange being stiffer than said actuation ring so as to be deformable against the shaft surface under increased sealed pressure loads generating a third fluid pressure of sealed fluid greater than said second fluid pressure, the actuation ring being pressed against the anti-extrusion ring at said second fluid pressure in facing contact such that said third fluid pressure can transfer to said anti-extrusion ring so that an inside diameter of said anti-extrusion ring comes into contact with the shaft surface to form the second shaft seal;

said inside diameters of said actuation ring and said anti-extrusion ring being greater than a shaft diameter of the shaft surface.

11. The abeyance seal according to claim 10, wherein said actuation ring is axially spaced from said anti-extrusion ring when undeformed.

12. The abeyance seal according to claim 11, wherein said abeyance seal includes a backing ring on an outboard side of said anti-extrusion ring wherein said anti-extrusion ring is spaced axially from said backing ring when undeformed.

13. The abeyance seal according to claim 12, wherein said anti-extrusion ring is deformable into contact with said backing ring when subjected to said third fluid pressure, said backing ring having a greater rigidity than said anti-extrusion ring.

14. The abeyance seal according to claim 13, wherein said anti-extrusion ring extends axially in the inboard direction and radially inwards, and has an inner end which is swingable into contact with said shaft surface when deformed by said third fluid pressure.

15. The abeyance seal according to claim 10, wherein said outside diameter of said actuation ring is unconstrained within said abeyance seal to facilitate deformation of said actuation ring.

16. The abeyance seal according to claim 15, wherein said actuation ring is rotatable about a centroid thereof when subjected to said second fluid pressure.

17. The abeyance seal according to claim 10, wherein said abeyance seal includes an expansion preventer having an annular flange surrounding said actuation ring to limit radial expansion of said inner diameter.

18. The abeyance seal according to claim 17, wherein said annular flange includes axial openings to permit said second fluid pressure to act on said first side of said actuation ring.

19. The abeyance seal according to claim 18, wherein said actuation ring is rotatable about a centroid thereof when subjected to said second fluid pressure, and said openings are located at or radially inwardly of said centroid of said actuation ring to facilitate rotation of said actuation ring.

20. The abeyance seal according to claim 17, wherein a coefficient of thermal expansion of said expansion preventer is less than a coefficient of thermal expansion of said actuation ring, and said expansion preventer fixes said radial gap.

* * * * *